United States Patent
Chen

(10) Patent No.: US 8,075,967 B2
(45) Date of Patent: Dec. 13, 2011

(54) GAS PERMEABLE MEMBRANE

(75) Inventor: John Chu Chen, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 722 days.

(21) Appl. No.: 12/198,758

(22) Filed: Aug. 26, 2008

(65) Prior Publication Data

US 2010/0055273 A1    Mar. 4, 2010

(51) Int. Cl.
  *B29D 22/00* (2006.01)
  *B29D 23/00* (2006.01)
  *B32B 1/08* (2006.01)

(52) U.S. Cl. ............... 428/35.7; 428/35.2; 428/36.9; 428/36.1; 428/220; 428/522; 525/191; 525/200; 525/221; 426/392

(58) Field of Classification Search ............ 428/35.2, 428/35.7, 36.9, 36.1, 220, 522; 525/191, 525/221, 200; 426/392
See application file for complete search history.

(56) References Cited

U.S. PATENT DOCUMENTS

| | | | |
|---|---|---|---|
| 4,734,324 A | 3/1988 | Hill | |
| 4,830,863 A | 5/1989 | Jones | |
| 4,842,875 A | 6/1989 | Anderson | |
| 4,879,078 A | 11/1989 | Antoon | |
| 4,910,032 A | 3/1990 | Antoon | |
| 4,923,703 A | 5/1990 | Antoon | |
| 5,045,331 A | 9/1991 | Antoon | |
| 5,160,768 A | 11/1992 | Antoon | |
| 5,254,354 A | 10/1993 | Stewart | |
| 5,783,302 A * | 7/1998 | Bitler et al. | |
| 6,013,293 A | 1/2000 | De Moor | |
| 6,210,724 B1 | 4/2001 | Clarke | |
| 6,376,032 B1 | 4/2002 | Clarke | |
| 6,548,132 B1 | 4/2003 | Clarke | |
| 7,169,451 B2 | 1/2007 | Clarke | |
| 2003/0198715 A1 * | 10/2003 | Morris et al. | 426/106 |
| 2007/0078223 A1 * | 4/2007 | Chen et al. | |
| 2007/0287019 A1 * | 12/2007 | Chen et al. | |

FOREIGN PATENT DOCUMENTS

| | | |
|---|---|---|
| EP | 0351115 B1 | 1/1990 |
| EP | 0351116 B1 | 1/1990 |
| WO | 2008/011025 A1 * | 1/2008 |
| WO | 2009/102686 A1 * | 8/2009 |

* cited by examiner

*Primary Examiner* — Michael C Miggins
(74) *Attorney, Agent, or Firm* — Lucas K. Shay

(57) ABSTRACT

Disclosed is a blended composition comprising a humidity-dependent composition having a ratio of wet cup permeance to dry cup permeance greater than 10 and a crystallizable polymer sufficiently permeable to oxygen, carbon dioxide and water vapor, exhibiting an increase in permeability to at least one of oxygen and carbon dioxide by a factor of at least 2.5 over a temperature range of 10° C. between 0° C. and 40° C. Also disclosed are packaging materials comprising the blended composition and methods for storing respiring materials using the packaging materials.

21 Claims, No Drawings

GAS PERMEABLE MEMBRANE

This invention relates to gas-permeable membranes and their uses in packaging, especially the packaging of fresh produce.

BACKGROUND OF THE INVENTION

Materials with variable permeance to gasses can be desirable for food packaging. Fresh cut fruit and vegetables, and other respiring biological materials, consume oxygen ($O_2$) and produce carbon dioxide ($CO_2$), at rates that depend upon temperature and the stage of their development. Their storage stability depends on the relative and absolute concentrations of $O_2$ and $CO_2$ in the atmosphere surrounding them, and on temperature. For example, $CO_2$ can react with moisture in the package to form carbonic acid. The carbonic acid formed can affect the quality of the produce by accelerating degradation of the produce.

It is also desirable for packaging of food items such as fresh produce to have low moisture permeance under conditions of typical cold storage (low temperatures and low humidity) to retain moisture within the package, thereby retarding desiccation of the produce and maintaining freshness. However, if the packaged produce is exposed to higher temperatures and humidity, such as in a warehouse that is not climate-controlled, increased respiration rates can lead to increased liquid water formation, due to high levels of trapped moisture inside the package, and increased levels of $CO_2$. Packaging that allows moisture vapor to permeate at higher ambient humidity would allow for moisture equilibration with the exterior of the package, thereby helping to minimize formation of carbonic acid by reducing the available liquid water. As a result, the produce would be protected from degradation by carbonic acid, which could allow for extended storage of produce without loss of food quality, even under storage conditions of variable ambient temperatures.

Accordingly, a respiring material is desirably stored in a container whose permeability to $O_2$, $CO_2$ and water vapor is correlated with (i) the atmosphere outside or inside the package, (ii) the rates at which the material consumes $O_2$ and produces $CO_2$ and water and (iii) the temperature, to produce an atmosphere within the container having $O_2$, $CO_2$ and moisture concentrations equal to the optimum values for preservation of the material.

The preferred packaging atmosphere depends on the stored material. For example, some materials, e.g. broccoli, are best stored in an atmosphere containing 1-2% $O_2$ and 5-10% $CO_2$. For other materials, an atmosphere containing 1-2% $O_2$ and 12-30% $CO_2$, e.g. about 15% $CO_2$, is preferred. $CO_2$ concentrations of 10 to 30% can slow the respiration rate of some fruit and reduce the activity of some decay-causing organisms; for example, a $CO_2$ concentration of 20% delays grey mold decay in raspberries and extends their shelf life.

Previous attempts to improve packaging of food items include controlled atmosphere packaging (CAP) and modified atmosphere packaging (MAP). These have been disclosed, for example, in U.S. Pat. Nos. 4,734,324, 4,830,863, 4,842,875, 4,879,078, 4,910,032, 4,923,703, 5,045,331, and 5,160,768, and EP Applications 0351115 and 0351116.

Side-chain crystallizable (SCC) polymers with temperature-variable permeability to $O_2$, $CO_2$ and water vapor as well as packages comprising these SCC polymers or microporous films coated with these SCC polymers have been disclosed. See, e.g., U.S. Pat. Nos. 5,254,354, 6,013,293, 6,210,724, 6,376,032, 6,548,132 and 7,169,451.

The compositions comprise blends of ethylene acid copolymers and organic acids, wherein the combined acid moieties have been at least partially neutralized with metal ions, the metal ions comprising a preponderance of alkali metal ions.

SUMMARY OF THE INVENTION

A composition comprises a blend of "intelligent" polymers, i.e., polymers with permeabilities to gasses and moisture vapor that change in either direction with changes in temperature and/or moisture. The polymers have variable gas permeabilities that can change radically and reversibly with relatively small changes in environmental relative humidity (humidity) and/or temperature.

A blended composition comprising a humidity-dependent composition and a crystallizable polymer wherein the humidity-dependent composition has a ratio of wet cup permeance to dry cup permeance greater than 10; and the crystallizable polymer has a first order transition point $T_m$ from 0° C. to 40° C. and a heat of fusion of at least 5 J/g, and is sufficiently permeable to oxygen, carbon dioxide, and/or water vapor; and the polymeric material exhibits an increase in permeability to at least one of oxygen, carbon dioxide, or water vapor by a factor of at least 2.5 over a temperature range of 10° C. between 0° C. and 40° C.

A packaging material, such as monolayer or multilayer films, structures comprises a gas permeable substrate adhered either directly or through an intervening layer to a layer comprising the composition, and packages can be prepared from the composition.

For example, the invention provides a package that is surrounded by air comprising a container comprising one or more control sections which provide the only way in which oxygen, carbon dioxide and water vapor can enter or leave the container comprising the composition above; and within the container, a material which is biologically active or interactive with the atmospheric environment through respiration, metabilization, complexation, etc., or contains microorganisms that cause biological changes, such as meat, sea food, fruit, produce, plants, flowers, seeds, cheese, pickled food, fermented food, and the like.

A method that may be useful for storing a biologically active material including or selected from the group consisting of meat, sea food, fruit, produce, plants, flowers, seeds, cheese, pickled food, fermented food, or combination of two or more thereof comprises placing the biologically active material inside a container comprising one or more control sections that provide the only way in which oxygen, carbon dioxide and/or water vapor can enter or leave the container, wherein the one or more control sections comprise the composition above;

storing the container in air, with the biological material inside it, at a temperature $T_1$ which is at least 0° C. and less than 40° C.; and storing the container in air, with biologically active material inside it, at a second temperature $T_2$ which is above $T_1$ and at most 40° C. and at which the permeability of the control section to at least one of oxygen and carbon dioxide is at least 2.5 times the permeability at $T_1$, or wherein the permeability of the control section to moisture is at least 10 times greater at an average relative humidity of 75% than at an average relative humidity of 25%.

DETAILED DESCRIPTION OF THE INVENTION

Articles comprising the composition provide an environment that adjusts to the respiration of the particular food or biological material and can be changed gradually, slightly or dramatically by changes in temperature and/or moisture.

The entire disclosures of all references are incorporated herein by reference.

The following abbreviations, definitions, and methods of measurement are used. OTR is $O_2$ transmission rate and $CO_2TR$ is $CO_2$ transmission rate. At 1 mil film thickness OTR and COTR values are called OPV (oxygen permeability value) and COPV (carbon dioxide permeability value) which are given in mil-cc/$m^2$-atm-24 hrs, with the equivalent in mil-cc/100 $inch^2$-atm-24 hrs given in parentheses. The OTR or $O_2$ permeability may be measured using a Mocon OX-TRAN 2/21 at a given temperature and relative humidity. Alternatively, OTR and COTR may be measured using a permeability cell (supplied by Millipore) in which a mixture of $O_2$, $CO_2$ and helium is applied to the sample, using a pressure of 0.7 kg/$cm^2$ (10 psi) except where otherwise noted, and the gasses passing through the sample were analyzed for $O_2$ and $CO_2$ by a gas chromatograph. The cell could be placed in a water bath to control the temperature. The abbreviation $P_{10}$ is used to denote the ratio of the oxygen permeability at a first temperature $T_1$ to the oxygen permeability at a second temperature $T_2$, wherein the second temperature is ten ° C. less than the first temperature; $T_1$ being 10° C. and $T_2$ being 0° C. unless otherwise noted. The abbreviation R is used to denote the ratio of $CO_2$ permeability to $O_2$ permeability, both permeabilities being measured at 20° C. unless otherwise noted.

For crystallizable polymers, $T_o$ is used to denote the onset of melting, $T_m$ is used to denote the peak melting point, the completion of melting is designated $T_f$, and $\Delta H$ is used to denote the heat of fusion. $T_o$, $T_m$, $T_f$, and $\Delta H$ are measured by means of a differential scanning calorimeter (DSC) at a rate of 10° C./minute as well known to those skilled in the art. Thus, $T_m$ is the temperature at the peak of the DSC curve, $T_o$ is the temperature at the intersection of the baseline and the onset line of the DSC peak, the onset line being defined as the tangent to the steepest part of the DSC curve below $T_m$. $T_f$ is the end of the DSC peak. The heat of fusion is the heat absorbed by the melting of the polymer between $T_o$ and $T_f$. The value of $T_f$-$T_o$, i.e. the temperature range over which melting takes place, may be more or less than 10° C.

For crystallizable polymers, the permeability may begin to increase in the region of $T_o$ and continue to increase up to and beyond $T_m$.

Smart blended composition denotes a composition comprising a humidity-dependent composition and a crystallizable polymer that has temperature-dependent permeability, as disclosed above. The composition has permeability to gasses such as oxygen, carbon dioxide and/or water vapor that changes radically and reversibly with relatively small changes in moisture and/or temperature.

Many previous permeable membranes are microporous; that is, they are permeable due to the presence of microscopic pores through which vapor can pass. The composition may be formed into a monolithic membrane that functions as a selectively permeable barrier. Monolithic membranes, in contrast to microporous membranes, have high water-entry pressure and are waterproof and liquidproof and may provide good barriers to liquid water while still allowing permeability to water vapor under appropriate conditions. A monolithic membrane may also function as a barrier to odors and has better tear strength compared to microporous membranes. While microporous films allow passage of all types of gas, monolithic permeable membranes provide selective permeability to certain gasses.

The first part of the smart blended composition comprises a composition having a ratio of wet cup moisture permeance to dry cup moisture permeance greater than 10 when measured according to ASTM E 96-00 at a temperature of 23° C.; wherein the wet cup permeance is determined at an average relative humidity (RH) of 75% and the dry cup permeance is determined at an average relative humidity of 25%. This composition has a variable permeability to water vapor, depending on the relative humidity of the environment. For example, water vapor transmission (permeation) values (WVPV), i.e. water vapor transmission rate (WVTR) at 1 mil film thickness, at 25% RH and RT (about 25° C.) is lower than 80, and at 75% RH and RT is greater than 800 mil-g/$M^2$-day. The ratio may be greater than 20, 50, or 75, up to a ratio of about 100, 150, or even higher.

The amount of the first part of the smart blended composition may be from about 10 to about 90, or from about 20 to about 80, or from about 40 to about 60 or about 50, weight % of the blended composition. The first part may also be from about 10, to about 50, or about 50 to about 90 weight % of the smart blended composition.

This humidity-dependent variable permeability composition may be an organic acid modified ionomer composition comprising, consisting essentially of, or produced from one or more ethylene acid copolymers or E/X/Y copolymers or ionomers of the acid copolymers; one or more carboxylic acids having from 4 to 36 carbon atoms, or salts thereof; and optionally 0.1 to 25 weight %, based on the composition, of one or more optional polymers which includes ethylene-containing polymers, propylene-containing polymers, or combinations thereof wherein E represents copolymerized units of ethylene, X is present in about 2 to about 35 weight % of the copolymer and represents copolymerized units of at least one $C_3$ to $C_8$ α,β-ethylenically unsaturated carboxylic acid, and Y present in 0 to about 35 weight % of the copolymer and represents copolymerized units of a softening comonomer (softening means that the polymer is made less crystalline);

the carboxylic acid or salt thereof is present in the composition from about 1 to about 50 weight % and the carboxylic acid is optionally substituted with from one to three substituents independently selected from the group consisting of $C_1$-$C_8$ alkyl group, OH group, and $OR^1$ group;

each $R^1$ is independently $C_1$-$C_8$ alkyl group, $C_1$-$C_6$ alkoxyalkyl group, or $COR^2$ group;

each $R^2$ is independently $C_1$-$C_8$ alkyl group;

at least 50% of the combined acidic groups in the E/X/Y copolymer and/or the organic acid may be nominally neutralized with metal ions to the corresponding salts; wherein at least 50% of the metal ions are alkali metal ions.

The acid copolymers used to make the compositions are preferably "direct" acid copolymers. "Direct" copolymers are polymers polymerized by adding all monomers simultaneously, as distinct from a graft copolymer, where another monomer is grafted onto an existing polymer, often by a subsequent free radical reaction.

Examples of X include (meth)acrylic acid, maleic acid, fumaric acid, itaconic acid, monoesters of fumaric acid or maleic acid (maleic half esters) including esters of $C_1$ to $C_4$ alcohols such as methyl, ethyl, n-propyl, isopropyl and n-butyl alcohols.

If present, Y may be 0.1 weight %, or about 2 to about 35 weight % of the E/X/Y copolymer. Examples of softening comonomers include alkyl acrylate, alkyl methacrylate, or combinations thereof wherein the alkyl groups have from 1 to 8, or 1 to 4, carbon atoms.

Ethylene acid copolymers may be produced by any methods known to one skilled in the art such as disclosed in U.S. Pat. No. 5,028,674 or by employing somewhat higher pressures than those at which copolymers with lower acid levels may be prepared.

Specific acid copolymers include ethylene/acrylic acid dipolymers, ethylene/methacrylic acid dipolymers, and ethylene/acrylic acid/n-butyl acrylate, ethylene/methacrylic acid/n-butyl methacrylate, ethylene/acrylic acid/iso-butyl acrylate, ethylene/methacrylic acid/iso-butyl methacrylate, ethylene/acrylic acid/methyl acrylate, ethylene/methacrylic acid/methyl methacrylate, ethylene/acrylic acid/ethyl acrylate terpolymers, and ethylene/methacrylic acid/ethyl methacrylate terpolymers, or combinations of two or more thereof. Other acid copolymers include ethylene/maleic acid and ethylene/maleic acid monoester dipolymers; and ethylene/maleic acid monoester/n-butyl (meth)acrylate, ethylene/maleic acid monoester/methyl (meth)acrylate, ethylene/maleic acid monoester/ethyl (meth)acrylate terpolymers, or combinations of two or more thereof.

Ionomers are obtained by neutralization of an acid copolymer. Neutralizing agents including metal cations such as sodium or potassium ions are used to neutralize at least some portion of the acidic groups in the acid copolymer. Unmodified ionomers are prepared from the acid copolymers such as those disclosed in U.S. Pat. No. 3,262,272. "Unmodified" refers to ionomers that are not blended with any material that has an effect on the properties of the unblended ionomer. The acid copolymers may be used to prepare unmodified, melt processable ionomers by treatment with a metal compound. The unmodified ionomers may be nominally neutralized to any level such as about 15 to about 90% or about 40 to about 75% of the acid moieties.

The organic acids may be monobasic, having fewer than 36 carbon atoms, or salts thereof and may be present in the ionomer or composition from about 1 to about 50 weight %. The acids are optionally substituted with from one to three substituents independently selected from the group consisting of $C_1$-$C_8$ alkyl, OH, and $OR^1$ in which each $R^1$ is independently $C_1$-$C_8$ alkyl, $C_1$-$C_6$ alkoxyalkyl or $COR^2$; and each $R^2$ is $C_1$-$C_8$ alkyl.

Examples of organic acids include $C_4$ to $C_{36}$ (such as $C_{34}$, $C_{4-26}$, $C_{6-22}$, or $C_{12-22}$) acids. At 100% nominal neutralization (i.e., sufficient metal compound is added such that all acid moieties in the copolymer and organic acid are nominally neutralized), volatility is not an issue and organic acids with lower carbon content may be used, though it is preferred that the organic acid (or salt) be non-volatile (not volatilize at temperatures of melt blending of the agent with the acid copolymer) and non-migratory (not bloom to the surface of the polymer under normal storage conditions (ambient temperatures)). Examples of organic acids include, but are not limited to, caproic acid, caprylic acid, capric acid, lauric acid, stearic acid, isostearic acid, behenic acid, erucic acid, oleic acid, and linoleic acid. Organic (fatty) acids include palmitic acid, stearic acid, oleic acid, erucic acid, behenic acid, isostearic acid, 12-hydroxystearic acid, or combinations of two or more thereof. Saturated organic acids, such as stearic acid and behenic acid, may be preferred.

Organic acids may be commercially available as a mixture of a named organic acid and a number of structurally different organic acids of varying lesser amounts. When a composition comprises a named acid, other unnamed acids may be present at levels conventionally known to be present in commercial supplies of the named acid.

Salts of any of these organic acids may include the alkali metal salts, such that the metal ions present in the final composition comprise at least 50% of alkali metal ions, including sodium, potassium salts and/or cesium salts.

The amount of basic metal compound capable of neutralizing acidic groups may be provided by adding the stoichiometric amount of the basic compound calculated to neutralize a target amount of acid moieties in the acid copolymer and organic acid(s) in the blend (hereinafter referred to as "% nominal neutralization" or "nominally neutralized"). Thus, sufficient basic compound is made available in the blend so that, in aggregate, the indicated level of nominal neutralization could be achieved. Greater than 50%, 60%, 70%, 80% or 90% (or even 100%) of the total acidic groups in the E/X/Y copolymers and organic acids may be nominally neutralized with metal ions; and the metal ions comprise at least 50 mole % alkali metal ions. Small amounts of salts of alkaline earth metal and/or transition metal ions may be present in addition to the alkali metals.

Metal compounds may include compounds of alkali metals, such as lithium, sodium, potassium, or cesium or combinations of such cations. Examples include sodium, potassium, cesium or any combination of sodium, potassium, and/or cesium, optionally including small amounts of other cations such as other alkali metal ions, transition metal ions or alkaline earth ions. Metal compounds of note include formates, acetates, nitrates, carbonates, hydrogencarbonates, oxides, hydroxides or alkoxides of the ions of alkali metals, especially sodium and potassium, and formates, acetates, nitrates, oxides, hydroxides or alkoxides of the ions of alkaline earth metals and transition metals. Of note are sodium hydroxide, potassium hydroxide, sodium acetate, potassium acetate, sodium carbonate and potassium carbonate.

The unmodified ionomers may be mixed with organic acids or salts thereof, metal compounds, and optional ethylene- or propylene-containing polymers, by any means known to one skilled in the art, to prepare compositions.

The modified ionomer composition may optionally comprise from about 0.1 to about 65, to about 55, to about 45, to about 35, to about 25, to about 15, or to about 10, weight %, based on the total amount of the modified ionomer composition, of one or more ethylene-containing polymers or propylene-containing polymers. For example, when the composition comprises 2 or 5 weight % to 25 weight % organic acids, the optional polymers may be present in the composition from about 10 to about 25 weight %. Blending with such polymers may provide better processability, improved toughness, strength, flexibility, and/or compatibility of the blend when adhering to a substrate as described below.

The optional polymers may include polyethylene (PE) homopolymers and copolymers, polypropylene (PP) homopolymers and copolymers, or combinations of two or more thereof.

PE homopolymers and copolymers may be prepared by a variety of methods, for example, the well-known Ziegler-Natta catalyst polymerization (e.g., U.S. Pat. Nos. 4,076,698 and 3,645,992), metallocene catalyzed polymerization, VERSIPOL catalyzed polymerization and by free radical polymerization. The polymerization may be conducted as solution phase processes, gas phase processes, and the like. Examples of PE polymers may include high density PE (HDPE), linear low density PE (LLDPE), low density PE (LDPE), very low or ultralow density PEs (VLDPE or ULDPE), lower density PE made with metallocene having high flexibility and low crystallinity (mPE). Metallocene technology is described in, for example, U.S. Pat. Nos. 5,272,236, 5,278,272, 5,507,475, 5,264,405, and 5,240,894.

The density of PE may range from about 0.865 g/cc to about 0.970 g/cc. Linear PE may incorporate α-olefin comonomers such as butene, hexene or octene to decrease density to within the density range so described. For example, a copolymer used may comprise a major portion (by weight) of ethylene that is copolymerized with another α-olefin having about 3-20 carbon atoms and up to about 20% by weight of the copolymer. Other α-olefins are propylene, 1-butene, 1-hexene, 4-methyl-1-pentene, 1-octene, 1-decene, 1-tetradecene, 1-octadecene, or in combinations of two or more.

The PE copolymer may also be an ethylene propylene elastomer containing a small amount of unsaturated compounds having a double bond. The term "PE" when used herein is used generically to refer to any or all of the polymers comprising ethylene described above.

Ethylene copolymers having small amounts of a diolefin component such as butadiene, norbornadiene, hexadiene and isoprene are also generally suitable. Terpolymers such as ethylene/propylene/diene monomer (EPDM) are also suitable.

PP polymers include homopolymers, random copolymers, block copolymers and terpolymers of propylene. Copolymers of propylene include copolymers of propylene with other olefins such as ethylene, 1-butene, 2-butene and the various pentene isomers, etc. and preferably copolymers of propylene with ethylene. Terpolymers of propylene include copolymers of propylene with ethylene and one other olefin.

PP homopolymers or random copolymers may be manufactured by any known process (e.g., using Ziegler-Natta catalyst, based on organometallic compounds, or on solids containing titanium trichloride). Block copolymers may be manufactured similarly, except that propylene is generally first polymerized by itself in a first stage and propylene and additional comonomers such as ethylene are then polymerized, in a second stage, in the presence of the polymer obtained during the first. Because the methods are well known to one skilled in the art, the description of which is omitted herein for the interest of brevity.

The ethylene-containing polymer may include ethylene copolymers obtained from copolymerization of ethylene with at least one polar monomer such as ethylene/vinyl acetate copolymer (EVA), ethylene/acrylic ester copolymers, ethylene/methacrylic ester copolymers, ethylene/vinyl acetate/CO copolymers, ethylene/acrylic ester/CO copolymers, ethylene/maleic anhydride copolymers, and/or mixtures of any of these.

EVA includes copolymers derived from the copolymerization of ethylene and vinyl acetate or the copolymerization of ethylene, vinyl acetate, and an additional comonomer. The vinyl acetate comonomer may have 2 to 45 or 6 to 30 weight % derived from vinyl acetate. An EVA may have a melt flow rate, measured in accordance with ASTM D-1238, of from 0.1 to 60 g/10 or 0.3 to 30 g/10 minutes. A mixture of two or more different EVAs may be used.

The optional polymer may optionally be modified by methods well known in the art, including modification with an unsaturated carboxylic acid or its derivatives, such as maleic anhydride or maleic acid.

Ethylene/alkyl (meth)acrylate copolymer includes copolymers of ethylene and one or more $C_{1-8}$ alkyl (meth)acrylates. Examples of alkyl (meth)acrylates include methyl acrylate, ethyl acrylate and butyl acrylate. Examples of the copolymers include ethylene/methyl acrylate copolymer ethylene/ethyl acrylate copolymer, ethylene/butyl acrylate copolymer, or combinations of two or more thereof. Alkyl (meth)acrylate may be incorporated into an ethylene/alkyl (meth)acrylate copolymer 2 to 45, 5 to 45, 10 to 35, or 10 to 28, weight %.

Ethylene/alkyl (meth)acrylate copolymers may be prepared by processes well known to one skilled in the art using either autoclave or tubular reactors. See, e.g., U.S. Pat. Nos. 2,897,183, 3,404,134, 5,028,674, 6,500,888, and 6,518,365. Because the methods for making an ethylene/alkyl (meth) acrylate copolymer are well known, the description of which is omitted herein for the interest of brevity. Tubular reactor produced ethylene/alkyl (meth)acrylate copolymers are commercially available from E. I. du Pont de Nemours and Company, Wilmington, Del. (DuPont) such as ELVALOY AC. The ethylene/alkyl (meth)acrylate copolymers may vary in molecular weight and the selection of the melt index (MI) grade of polymer may be made by balancing the properties of the ethylene/alkyl (meth)acrylate copolymer with those of the neutralized organic acid and ethylene acid copolymer to provide the desired mix of permeability and structural properties needed for a specific variable permeability construction. A mixture of two or more different ethylene/alkyl (meth)acrylate copolymers may be used. Of note is a composition wherein at least one ethylene/alkyl (meth)acrylate copolymer is present in up to 15 weight %.

An anhydride-modified polymer may be used as the optional polymer and comprise a copolymer having an unsaturated dicarboxylic acid anhydride repeat unit, including maleic anhydride, citraconic anhydride, itaconic anhydride, tetrahydrophthalic anhydride, or combinations of two or more thereof. The modified copolymer may be obtained by known techniques, such as a grafting process in which a polymer selected from a PE homopolymer or copolymer, a PP homopolymer or copolymer, an EVA or an ethylene/alkyl (meth)acrylate copolymer, as disclosed above, is dissolved in an organic solvent with an unsaturated dicarboxylic acid anhydride or its functional equivalent and a radical generator, followed by heating with stirring; and a process in which all the components are fed to an extruder to provide a maleic-anhydride grafted ethylene copolymer. Grafting processes provide copolymers with from 0.1 to 3 weight % of anhydride units. These graft copolymers are available commercially from DuPont under the FUSABOND or BYNEL brand names.

Ethylene copolymers that include reactive functional groups such as maleic anhydride also may be readily obtained by a high-pressure free radical process, in which an olefin comonomer and a functional comonomer are directly copolymerized. A suitable high-pressure process is described, for example, in U.S. Pat. No. 4,351,931. This process allows for preparation of copolymers with greater than 3 weight %, for example, about 4 or 5 weight % to about 15 weight %, of anhydride units. These copolymers include olefin/maleate copolymers such as ethylene/maleic anhydride.

The composition disclosed above may be produced by any means known to one skilled in the art. It is substantially melt-processable and may be produced by combining one or more ethylene acid copolymers, one or more monobasic carboxylic acids or salts thereof, basic compound(s) and optionally one or more optional polymers to form a mixture; and heating the mixture under a condition sufficient to produce the composition. Heating may be carried out under a temperature in the range of from about 80 to about 350, about 100 to about 320, or 120 to 300° C. under a pressure that accommodates the temperature for a period from about 30 seconds to about 2 or 3 hours. For example, the composition may be produced by melt-blending an acid copolymer and/or ionomer thereof with one or more organic acids or salts thereof; concurrently or subsequently combining a sufficient amount of a basic metal compound capable of neutralization of the acid moieties to nominal neutralization levels greater than 50, 60, 70, 80, 90%, to near 100%, or to 100%; and optionally, combining an optional polymer disclosed above. A salt-andpepper blend of components may be made or the components may be melt-blended in an extruder. For example, a twin-screw extruder may be used to mix and treat the acid copolymer and the organic acid (or salt) with the metal compound at the same time. It is desirable that the mixing is conducted so that the components are intimately mixed, allowing the basic metal compound to neutralize the acidic moieties.

Treatment of acid copolymers and organic acids with metal compounds in this manner (concurrently or subsequently), such as without the use of an inert diluent, may produce a composition without loss of processability or properties such as toughness and elongation to a level higher than that which would result in loss of melt processability and properties for the ionomer alone.

The second part of the blended composition is a crystallizable polymer that may provide a temperature-dependent variable permeability component to the smart blended composition. Depending on the nature of the crystallizable polymer, its permeability may change relatively gradually or relatively rapidly in the region of the first order transition point of the polymer. For example, the polymers may be designed to be relatively impermeable to one or more gasses at a given temperature and then become substantially permeable to one or more gasses above a given transition point temperature. The polymers may undergo one or more phase changes. Crystallizable polymers having a first-order transition temperature or melting point in the range of 0° C. to about 40° C. are used in the blended composition. "Melting point" or "first order transition" refers to the temperature at which an equilibrium process causes certain portions of the polymer, initially aligned in an ordered array, to become disordered. "Freezing point" refers to the temperature at which an equilibrium process causes those certain portions of the polymer, initially disordered, to become aligned in an ordered array. The first-order transition temperature or melting point may be in the range of about 10° C. to about 25° C. Depending on the type of product being preserved and the results desired, a sharp or gradual melting may be preferred. If rapid melting is preferred, the melting may occur over a relatively narrow temperature range, less than about 10° C., or less than about 5° C.

The polymers may be selected so that the membrane has a desired $P_{10}$ ratio and a desired R ratio. For example, by choosing a crystallizable polymer whose $T_m$ is within or a little below an expected range of storage temperatures, it is possible to produce a membrane whose $P_{10}$ is relatively large in the storage temperature range; furthermore, the size of the $P_{10}$ ratio may be increased by increasing the $\Delta H$ of the polymer used in the membrane. Similarly, a membrane having a relatively large (or small) R ratio may be produced by selecting a polymer having a relatively high (or small) inherent R ratio. In this way, it is possible to produce membranes whose properties may be tailored, much more closely than was previously possible, to the needs of a particular respiring biological material.

The crystallizable polymer may be a single polymer or a mixture of two or more different polymers. Preferably the crystallizable polymer has a $T_m$ of −5 to +40° C., particularly −5 to 15° C., especially 0 to 15° C., e.g. 1 to 15° C., and a $\Delta H$ of at least 5 J/g or at least 20 J/g, to about 100 J/g, or higher. The higher the $\Delta H$ of the polymer, the higher its $P_{10}$ value over temperature ranges which include $T_m$. $T_m$ and $T_o$ values of the polymer may be such that $T_m - T_o$ is less than 10° C., particularly 5 to 10° C.

Suitable polymers include those described in U.S. Pat. No. 5,254,354 including side chain crystallizable (SCC) polymers. Side-chain crystallizable polymers are described within the Journal of Polymer Science: Macromolecule Reviews (1974) 8:117 and Journal of Polymer Science: Polymer Chemistry Addition (1981) 19:1871-1873. SCC polymers are sometimes referred to as "comb-like" polymers and are available commercially. These polymers are generally reviewed in the "Macromolecular Review" article referred to above. SCC polymers may be prepared for example by copolymerizing (i) at least one n-alkyl or fluoroalkyl acrylate or methacrylate in which the alkyl group contains at least 12 carbon atoms, preferably one or more of docosanyl, octadecyl, hexadecyl, tetradecyl, and dodecyl acrylates, and (ii) one or more comonomers selected from acrylic acid, methacrylic acid, esters of acrylic or methacrylic acid in which the esterifying group contains less than 10 carbon atoms, e.g. hydroxyethyl butyl, hexyl, cyclohexyl, or 2-ethyl hexyl, and highly polar monomers such as polyethylene glycol acrylate or methacrylate. These SCC polymers may have a high R ratio, e.g. greater than 5, except for those polymers which contain substantial amounts of fluoroalkyl and/or cycloalkyl groups.

The backbone of the polymer may be any organic structure (aliphatic or aromatic hydrocarbon, ester, ether, amide, etc.) or an inorganic structure (sulfide, phosphazine, silicone, etc.). The spacer linkages may be any suitable organic or inorganic unit, for example ester, amide, hydrocarbon, phenyl, ether, or ionic salt (for example a carboxylalkyl ammonium or sulfonium or phosphonium ion pair or other known ionic salt pair). The side-chain may be aliphatic or aromatic or a combination of aliphatic side-chains of at least 10 carbon atoms, fluorinated aliphatic side-chains of at least 6 carbons, and p-alkyl styrene side-chains wherein the alkyl is of 8 to 24 carbon atoms.

The length of each side-chain moiety is usually greater than 5 times the distance between side-chains in the case of acrylates, methacrylates, vinyl esters, acrylamides, methacrylamides, vinyl ethers and α-olefins. In the extreme case of a fluoroacrylate alternate copolymer with butadiene, a side chain may be as little as 2 times the length of the distance between branches. In any case, the side-chain units may make up greater than 50% or 65% of the volume of the polymer. Comonomers added to a side-chain polymer usually have an adverse effect on crystallinity. Small amounts of various comonomers may be tolerated, usually up to 10 to 25 volume %. It may be desirable to add a small amount of comonomers such as cure site monomers including acrylic acid, glycidal methacrylate, maleic anhydride, amino functional monomer and the like.

The crystallizable polymers may have an average molecular weight (Mw) greater than 250,000 and are optionally cross-linked. When the side chains are simple aliphatic hydrocarbons, the longer the carbon chain, the higher the melting point and the greater the permeability changes the polymer may undergo. Use of very regular polymers (e.g. polymers having a large percentage of 14-carbon chains) give rise to polymers with sharp permeability changes whereas polymers with less regular structure (mixtures of various carbon chain links) give rise to broad permeability ranges. Narrow or broad permeability ranges may be desirable depending upon the particular biological material being packaged.

Other polymers which may be used include acrylate polymers (including methacrylate polymers) which are not SCC polymers, e.g. acrylate polymers which are derived from one or more monomers as specified above; fluoropolymers (a polymer in which the atomic ratio of fluorine to carbon is at least 1.5, or at least 2), cis-polybutadiene, poly(4-methylpentene), polydimethyl siloxanes, ethylene-propylene rubbers, or polyurethanes.

Other polymers which may be used to prepare membranes with high R ratios include polyurethanes (e.g. that available under the tradename BION II from Goldschmidt, Germany) and cellulose acetate.

The main properties of the SCC polymer affecting its permeability may include melting point, glass transition, crystallinity, crosslink density, and sidechain structure. Melting point may be chosen to correlate to the temperature at which a particular gas permeability is desired. For instance, if one desires a food package to have increased gas permeability at 25° C. or above, a SCC polymer having a melting point of approximately 25° C. may be chosen. The % crystallinity of the polymer (below its melt point) may be in the range of 10% to 55%, or 15% to 50%. The higher the crystallinity, the greater the change in permeability may exhibit at phase transition. The permeability of the composition may be substantially greater, e.g., at least threefold or at least fivefold higher at or above its melting point than at temperatures below the melting point of the crystallizable polymer.

For use in a temperature responsive membrane, the SCC polymer is in a form in which it retains its shape and is not free to flow at its melting temperature (i.e., the temperature/temperature range at/over which the side chains undergo a phase change from crystalline to amorphous). Otherwise, the polymer may not remain in its intended location (interposed between the food and the outside environment) and may be displaced or dispersed elsewhere due to gravitational or other forces.

The amount of the SCC polymer may be from about 10 to about 90, about 20 to about 80, about 30 to about 70, or about 40 to about 60, or about 50 weight %, of the smart blended composition. The crystallizable polymer may also be from about 50 to about 90 weight % of the smart blended composition.

The crystallizable polymer may be dispersed (or blended homogeneously) into a continuous or co-continuous phase matrix material comprising the modified ionomer composition described above at various loadings (e.g., equal to or greater than 20%, 30%, 40%, 50%, 60%, 70%, 80% or 90%). At such volumes, there are sufficient amounts of the dispersed SCC polymer to form continuous paths of SCC polymer through the matrix. In effect, such dispersions function as if the crystallizable polymer is suspended within a porous network or mesh. In this regard, it is desirable that the crystallizable polymer be a continuous phase if the modified ionomer composition is relatively impermeable to gasses such as oxygen or carbon dioxide, and may be dispersed in the modified ionomer composition if the modified ionomer composition is highly permeable to those gasses. Dispersion in this manner provides a means for retaining the SCC polymer as part of the smart blended composition in a variable permeability membrane.

It is desirable to have the polymer components for the smart blended composition having similar melt indices. The mixing could be achieved by employing a batch mixer, such as a Banbury internal mixer, a roll mill, etc., or a continuous mixer, such as single screw extruder, twin screws extruder, FCM, etc.

The smart blended composition may additionally comprise small amounts of additives commonly used and well known in the adhesive art including plasticizers, stabilizers including viscosity stabilizers and hydrolytic stabilizers, primary and secondary antioxidants, ultraviolet ray absorbers, anti-static agents, dyes, pigments or other coloring agents, inorganic fillers, fire-retardants, lubricants, reinforcing agents such as glass fiber and flakes, synthetic (for example, aramid) fiber or pulp, foaming or blowing agents, processing aids, slip additives, antiblock agents such as silica or talc, release agents, tackifying resins, or combinations of two or more thereof. These additives are described in the Kirk Othmer *Encyclopedia of Chemical Technology*.

These additives may be present in the smart blended composition in quantities ranging from 0.01 to 15, 0.01 to 10, or 0.01 to 5, weight %. The incorporation of the additives may be carried out by any known process such as, for example, by dry blending, by extruding a mixture of the various constituents, by the conventional masterbatch technique, or the like.

Preferably the smart blended composition is bondable or heat sealable. The smart blended composition may have a permeance (water vapor diffusion) dependent on the ambient humidity, allowing it to be used to prepare a membrane with variable vapor permeability, with a permeance that varies depending on the relative humidity. The variably permeable membrane may also be termed a "humidity-adaptive smart vapor barrier". The smart blended composition has a moisture vapor transmission as measured by WVPV above 100 g-mil/m$^2$-24 h, above 200 g-mil/m$^2$-24 h, and may have WVPV above 1000, above 5000, or above 10,000 g-mil/m$^2$-24 h, up to 50,000 g-mil/m$^2$-24 h or higher, when measured at 37.8° C. and 100% relative humidity. Of note is a multilayer structure wherein the humidity-dependent composition has water vapor transmission rate at 25% relative humidity and 23° C. lower than 10 mil-g/m$^2$-day, and at 75% relative humidity and 23° C. greater than 100 mil-g/m$^2$-day; or wherein the humidity-dependent variably permeable composition has water vapor transmission rate at 25% relative humidity and 23° C. lower than 20 mil-g/m$^2$-day, and at 75% relative humidity and 23° C. greater than 200 mil-g/m$^2$-day; or wherein the humidity-dependent variably permeable composition has water vapor transmission rate at 25% relative humidity and 23° C. lower than 30 mil-g/m$^2$-day, and at 75% relative humidity and 23° C. greater than 300 mil-g/m$^2$-day.

The smart blended composition may be in the form of a film used in packaging. The humidity-dependent behavior of the composition leads to a lower permeance being achieved under cold, dry conditions (such as cold storage of food items) than under warm, humid conditions. In this way, the smart blended composition is effective in preventing moisture from diffusing from the interior of a package into the surrounding air and drying the food items contained in the package during cold storage. Under conditions of high humidity such as when the contained biological material has increased respiration, the humidity-dependent behavior of the smart blended composition provides moisture flow out of the package when needed, to facilitate a drying out process and to avoid water condensation in the package during storage. This behavior reduces the risk of damage to the food items contained in the package due to excess moisture retention, such as from production of carbonic acid.

The smart blended composition may also have permeability to oxygen and/or carbon dioxide that is temperature dependent to allow the package to increase permeability to gasses as the temperature is increased, for example, when the package is removed from refrigeration. The increased permeability allows the package to adjust the oxygen and/or carbon dioxide content of the package in response to increased respiration by the biological material due to the higher temperatures. The composition may have a permeability to oxygen of greater than about 1000 ml-mil/(m$^2$-day-atm) at 25° C. Materials with significantly lower permeability (e.g., one-half or less the permeability) require too much surface area to be generally useful in most packaging applications which require active gas exchange.

For example, the smart blended composition, either in the form of a film or combined with a substrate, may be used in packaging food items such as fresh fruit and vegetables, or in packaging fresh flowers.

The smart blended composition may be applied to a substrate or a substrate comprising a carrier, both can be selected from the group consisting of cellulosic materials, nonwoven or woven textiles, microporous films and perforated films. A layer comprising the composition may be adhered to the substrate by for example, extrusion, coextrusion, lamination or coating. For example, the composition may be applied as a coating or a laminate to the carrier or substrate. A film comprising the composition may be laminated to a substrate. To avoid hindering permeation, the substrate may be such that it has a water vapor and/or gas permeability that is greater than the permeability of the smart blended composition so that the diffusion characteristics of the structure are essentially provided by the smart blended composition.

Cellulosic materials such as paper webs (for example Kraft or rice paper), materials made from synthetic fiber spun fabrics, nonwoven textiles, microporous films, or even perforated films having large percentages of open areas such as perforated PE films, may be used as materials for the carrier(s) or substrate(s), for example. These materials may be reinforced with fibers. Microporous films of note may be prepared from polypropylene, polyethylene or combinations thereof. They may be monolayer or multilayer films (for example, three-layer films comprising an inner layer of polypropylene between two outer layers of polyethylene). Microporous films are available from Celgard, LLC, Charlotte, N.C. under the CELGARD tradename.

Suitable polymers for the a microporous film are (1) linear ultrahigh molecular weight polyethylene having an intrinsic viscosity of at least 18, preferably 18 to 39, deciliters/gram, (2) linear ultrahigh molecular weight polypropylene having an intrinsic viscosity of at least 6 deciliters/gram, and (3) mixtures of (1) and (2).

The microporous film may include a finely divided, particulate, substantially water-insoluble, inorganic filler, for example a siliceous filler, which is distributed throughout the matrix and which is present in amount 50 to 90%, particularly 50 to 85%, by weight of the film. The filler may be silica, precipitated silica, or silica having an average ultimate particle size of less than 0.1 μm and may occupy 35 to 80% of the total volume of microporous film. Because they have a relatively narrow range of pore sizes, films may be made by extruding a polymeric composition which contains an inorganic filler and a processing oil, e.g. a paraffinic oil, naphthenic oil or aromatic oil, uniformly distributed therein; followed by extraction of the processing oil, e.g. with trichloroethylene. Some films are disclosed, for example, in U.S. Pat. Nos. 4,937,115 and 3,351,495 and films are sold by PPG Industries under the tradename TESLIN.

Specific examples of porous or perforated films include a porous PE film having a porosity of about 55% and a pore size of about 0.25 microns, available under the tradename CELGARD K878 from Hoechst Celanese Corp; a porous PE film available under the tradename MSX 1137P from 3M Co.; and a filled porous PE film available under the designation Van Leer 10X from Van Leer Corp. TESLIN SP7 is a filled porous PE film containing about 60% silica, having a thickness of about 0.18 mm (0.007 inch), a tear strength measured as described above of about 90 g, a porosity of about 65%, an average pore size of about 0.1 micron and a largest pore size of 4 to 10 microns. TESLIN X457 is similar to TESLIN SP7 but is more porous. TESLIN SP10 is similar to Teslin SP7 but has a thickness of about 0.25 mm (0.010 inch). All three TESLIN films are available from PPG Industries. A perforated high density polyethylene film, 0.11 mm (4.5 mil) thick, with an open area of about 36%, is available under the tradename DELNET from Applied Extrusion Technologies.

The composition may be applied to any of these carriers or substrates as a film or membrane, a laminated layer or as a coating (via extrusion coating, spraying, painting or other appropriate application methods). The coating or laminate can be applied to one side or both sides of the substrate. In the case where the textile substrate is coated or laminated on one side, the composition may be applied to the side that is directly exposed to the biological and/or chemical agents to provide an impermeable outer surface. Alternatively, in applications where mechanical wear or abrasion is likely, the composition may be applied to the side of the textile substrate opposite the side exposed to the mechanical wear to afford protection of the polymeric composition. The coating or laminate material may be effectively protected from both sides from mechanical wear and it may therefore ensure the desired water vapor and gas diffusion properties over an extended period of time. Several such layer assemblies may also be assembled one above the other.

Of note Includes composition being applied to a microporous film by, for example but not limitation, extrusion coating or lamination by methods well known to one skilled in the art.

The packages comprising the composition form into structural components that provide reversible, gas permeability changes which are temperature and/or humidity dependent. The structural components maintain their integrity within the temperature ranges and may be formulated so as to provide sufficient structural integrity to enclose and adequately protect the food product. The composition may form components which retain their shape and structure and do not freely flow within temperature ranges which the packages are normally subjected to; exhibit one or more phase transitions at phase transition temperature points; have substantially greater permeability to a gas or gasses at temperatures equal to or greater than a selected temperature than at temperatures below the selected temperature; have substantially greater permeability to a water vapor at high humidity than at low humidity; and are structurally positioned so as to regulate gas flow between an outside environment and the internal package environment that holds the content. The rate of gas flow between the outside environment and the internal package environment may be regulated by changing the temperature and/or humidity and thereby changing the permeability of the smart blended composition with respect to gasses in both environments.

A variety of structural configurations may be used to produce the package. For example, the smart blended composition may be in the form of a flexible sheet. The sheet material may be wrapped around a dynamic biological material such as a food product in the same way conventional polymeric transparent food wrap materials are used. Other embodiments of the package may be conceived. It is desirable to construct the package so that the inside environment of the package is completely separated (i.e., airtight other than permitted by material permeability) with respect to the outside environment. The package may be container, cover, wrapping, shield, a rigid or semi-rigid or flexible structure, packaging material, monolayer film, multilayer film, sheet, bag, pouch, package, or structure comprising a gas permeable substrate adhered either directly or through an intervening layer to a layer comprising the composition. Some possible structural configurations are as follows:

(1) Sheets of material comprising the smart blended composition that may be wrapped around the biological material being packaged.

(2) Bags or pouches which are comprised completely of the smart blended composition described herein or which comprise other polymeric materials and have windows, patches or areas thereon which comprise the smart blended composition.

(3) Rigid or semi-rigid or flexible structures such as trays, cups, tubs and the like, comprised completely of the composition or comprised in part of other materials having one or more windows of the composition thereon.

(4) Lidding material comprised of the smart blended composition or comprised in part of other materials having one or more windows of the smart blended composition thereon. The lidding material may be used in combination with rigid or semi-rigid or flexible structures such as trays, cups, tubs and the like to prepare a package comprising the composition.

(5) Patches of the composition over designed openings of packages to provide the desired variable permeability when the environment changes.

(6) Packages in which the smart blended composition is covered by a removable protective cover that allows a user to expose the smart blended composition to the environment at an appropriate time. For example, the protective cover may comprise a material with low adhesion to the smart blended composition that may be peeled away from the surface of the smart blended composition when desired. Alternatively, the cover may be removable material that overlays the smart blended composition, but is not adhered to it, in a package. For example, the protective cover may be a lid, flap or patch of protective material that may be removed when desired. The protective cover may also be placed over a patch or window of the smart blended composition in a package.

The following Examples are presented to illustrate the invention, but are not meant to be unduly limiting.

EXAMPLES

Cast films were prepared from the materials listed below.

Materials: EMAA-1: an ethylene methylacrylic acid (19 wt %) copolymer with MI of 300 g/10 min; EMAA-2: an ethylene methylacrylic acid (11 wt %) copolymer with MI of 100 g/10 min; EMAA-3: an ethylene methylacrylic acid (19 wt %) copolymer with MI of 60 g/10 min; EMA-1: an ethylene methyl acrylate (24 wt %) copolymer with MI of 20 g/10 min; EMA-2: an ethylene methyl acrylate (24 wt %) copolymer with MI of 2 g/10 min; Ionomer-1: an ethylene methylacrylic acid (19 wt %) copolymer neutralized with sodium (37% nominally neutralized) with MI of 2 g/10 min; HSA: 12-hydroxystearic acid from ACME-Hardesty Co. ISA: Iso-stearic acid supplied by Arizona Chemical; Base MB-1: a blend of 59.5 wt % $Na_2CO_3$ in an ethylene methylacrylic acid (10 wt %) copolymer with MI of 450 g/10 min; Base MB-2: a blend of 50% $K_2CO_3$ in an E/methyl acrylate (24 wt %) copolymer with MI of 20 g/10 min.

The materials were melt-blended in a twin-screw extruder at 20 lb/h (about 9 kg/h) throughput rate to provide compositions summarized in Table 1 below. In Table 1, Examples 2 and 4 were Examples 1 and 3, respectively, diluted with additional ionomer, but no additional modifier or base. Unless noted otherwise in Table 2, the compositions were cast into films of 2 to 2.5 mils thickness via a 28 mm W&P twin screw extruder.

TABLE 1

| Example | Acid copolymer or ionomer (wt %) | Additional Polymer (wt %) | Modifier (wt %)[1] | Neutralizing Agent (wt %) | Nominal Neutralization |
|---|---|---|---|---|---|
| 1 | Ionomer-1 (72.57) | 0 | 18.14 | KOH (8.89) | 100 |
| 2 | Ex. 1 (25) + Ionomer-1 (75) | 0 | — | — | — |
| 3 | Ionomer-1 (83.33) | 0 | 9.26 | KOH (7.41) | 90 |
| 4 | Ex. 3 (50) + Ionomer-1 (50) | 0 | — | — | — |
| 5 | Ionomer-1 (61.7) + EMAA-3 (15.0) | EMA-2 (7.22) | 3.25 | MB-2 (12.84) | 80 |
| 6 | Ionomer-1 (58.76) + EMAA-3 (15) | EMA-2 (10.92) | 3.09 | MB-2 (12.23) | 79 |
| 7 | Ionomer-1 (55.78) + EMAA-3 (15) | EMA-2 (14.68) | 2.94 | MB-2 (11.61) | 78 |
| 8 | EMAA-1 (75.37) | 0 | 3.14 | K2CO3 (21.49) | 88 |
| 9 | EMAA-1 (78.38) | 0 | 3.27 | $K_2CO_3$ (11.17) + MB-1 (7.18) | 88 |
| 10 | EMAA-1 (59.71) | EMA-1 (21) | 3.36 | $K_2CO_3$ (9.67) + MB-1 (6.22) | 98 |
| 11 | EMAA-1 (57.72) | EMA-1 (20.3) | 3.25 | $K_2CO_3$ (18.71) | 98 |
| 12 | EMAA-2 (68.05) | EMA-1 (25) | 1.39 | $K_2CO_3$ (5.56) | 88 |
| 13 | EMAA-2 (60.92) | EMA-1 (24.70) | 6.77 | $K_2CO_3$ (7.61) | 91 |
| 14 | EMAA-1 (81.6) | 0 | 3.4 | MB-1 (15.0) | 88 |
| 15 | EMAA-1 (73.7) | 0 | 10.05 | MB-1 (16.25) | 93 |
| 16 | EMAA-1 (71.55) | EMA-1 (10.70) | 3.43 | MB-1 (14.31) | 95 |
| 17 | EMAA-1 (61.82) | EMA-1 (21.8) | 3.48 | MB-1 (12.93) | 98 |
| 18 | EMAA-1 (58.32) | EMA-1 (17.20) | 10.29 | MB-1 (14.24) | 98 |
| 19 | EMAA-1 (58.98) | EMA-1 (21.70) | 6.07 | MB-1 (13.27) | 99 |

[1]Modifier was HAS, except that in Example 1 ISA was used and no modifier in Examples 2 and 4.

The moisture permeance was measured for each composition using protocols according to ASTM E 96-00. Dry Cup permeance was measured according to Procedure A, using an average relative humidity (RH) of 25%, with the RH on one side of the film at 0% and the RH on the other side at 50% at a temperature of 73° F. (23° C.). Wet Cup permeance was measured according to Procedure B, using an average RH of 75%, with the RH on one side of the film at 50% and the RH on the other side at 100% at a temperature of 73° F. (23° C.).

The resulting data expressed as Permeance are presented in Table 2 below. In Table 2, "Ratio" is the wet cup permeance divided by the Dry cup permeance and is an indication of the variability in permeance for the different humidity protocols. When films of different thickness were used for a composition, the average ratio was calculated.

Some samples were also tested for WVPV, following ASTM D6701-01, at 37.8° C. and 100% RH on a Mocon PERMATRAN-W 101K. These results are also reported in Table 2.

TABLE 2

| Example | Measured Permeance (perms) | | | WVPV (g-mil/m²-24 h) |
|---|---|---|---|---|
| | Dry cup | Wet cup | Ratio | |
| 1 | 0.59 | 40 | 68 | 1738 |
| 2 | 0.37 | 5.4 | 15 | 231 |
| 3 | 3.32 | 91.4 | 28 | 5188 |
| 4 | 0.43 | 21.3 | 50 | 718 |
| 5 (1 mil) | 1.5 | 64.5 | 43 | — |
| 5 (2 mil) | 0.97 | 48.1 | 50 | 3383 |
| 5 (4 mil) | 0.76 | 46.3 | 61 | — |
| Average Ratio | | | 51 | |
| 6 (1 mil) | 1.45 | 52.2 | 36 | — |
| 6 (2 mil) | 1.13 | 42.2 | 37 | 4219 |
| 6 (4 mil) | 0.86 | 36.9 | 43 | — |
| Average Ratio | | | 39 | |
| 7 (1 mil) | 0.9 | 34.7 | 39 | — |
| 7 (2 mil) | 0.51 | 34 | 67 | 2183 |
| 7 (4 mil) | 0.34 | 24.6 | 72 | — |
| Average Ratio | | | 59 | |
| 8 (4 mil) | 1.3 | 70.8 | 54 | 10333 |
| 8 (6 mil) | 1.3 | 72.0 | 58 | — |
| Average Ratio | | | 56 | |
| 9 (4 mil) | 0.7 | 59.3 | 85 | 5079 |
| 9 (6 mil) | 0.7 | 54.0 | 81 | — |
| Average Ratio | | | 83 | |
| 10 (4 mil) | 0.8 | 55.5 | 70 | 5006 |
| 10 (6 mil) | 0.7 | 43.3 | 62 | — |
| Average Ratio | | | 66 | |
| 11 (4 mil) | 2.5 | 34.3 | 14 | 4415 |
| 11 (6 mil) | 2.2 | 33.3 | 15 | — |
| Average Ratio | | | 14.5 | |
| 12 | 0.7 | 7.1 | 10 | 771 |
| 13 | 0.72 | 11.8 | 16 | 1111 |
| 14 | 0.26 | 48.1 | 185 | 2347 |
| 15 | 0.29 | 48.4 | 167 | 3528 |
| 16 | 0.38 | 47.1 | 124 | 4627 |
| 17 | 0.53 | 30.4 | 57 | 1996 |
| 18 | 0.46 | 43.9 | 95 | 3185 |
| 19 | 0.39 | 24.5 | 63 | 2546 |

Water vapor permeance is dependent on thickness and the permeance of the test films of a given thickness may be related to permeance of other thicknesses. For example, the permeance of Examples 14-16 may be converted to permeance of thicker films as shown in Table 3.

TABLE 3

| | Measured Permeance (perms) | | | Calculated Permeance (for 4X thickness) | |
|---|---|---|---|---|---|
| Example | Dry cup | Wet cup | Ratio | Dry cup | Wet cup |
| 20 | 0.26 | 48.1 | 185 | 0.07 | 12.0 |
| 21 | 0.29 | 48.4 | 167 | 0.07 | 12.1 |
| 22 | 0.38 | 47.1 | 124 | 0.095 | 11.8 |

The second part of the smart blended composition may be prepared according to methods disclosed in U.S. Pat. Nos. 5,254,354 and 6,376,032.

Crystalline polymer A: polymethyltetradecyl siloxane available commercially from Petrarch Systems.

Preparation of Crystalline Polymer B

A SCC polymer was prepared by heating a mixture of 195.4 g hexadecylacrylate, 195.2 g tetradecylacrylate, 10.0 g of acrylic acid and 4.0 grams of azobisisobutyronitrile in 800 ml of toluene at 60° C. for 14 hours. The resultant polymer had a $T_m$ peak 34° C. with a heat of fusion of 60 J/g and had a molecular weight of 147,000 daltons.

Preparation of Crystalline Polymer C

A SCC polymer melting at 30° C. was prepared by polymerizing pentadecylacrylate in 1:1 heptane:ethylacetate.

SCC 1-15 and ACP. These acrylate polymers were prepared by polymerizing the monomers and parts by weight shown in Table 4 having the abbreviations: AA is acrylic acid, MAA is methacrylic acid, EHA is 2-ethylhexyl acrylate, C4A is butyl acrylate, C6A is hexyl acrylate, CY6MA is cyclohexylmethacrylate, C6DA is hexyldiacrylate, C12A is dodecyl acrylate, C12DA is dodecyl diacrylate, C14A is tetradecyl acrylate, C16A is hexadecyl acrylate, and C22A is behenyl acrylate. The monomers were copolymerized in a suitable solvent, e.g. toluene or a mixture of heptane and butyl acetate or ethyl acetate, using a suitable initiator, e.g. azobisisobutyronitrile (AIBN). For example, SCC11 was made by mixing the C6A and C14A with 0.31 parts of AIBN in a 4:1 mixture of heptane and ethyl acetate, and maintaining the mixture at 50° C. for 2 days, to give a product having a weight average molecular weight of about 970,000 and a $T_m$ of about 12.5° C. SCC 5 was made by polymerizing the C22A alone, functionalizing the resulting homopolymer with isocyanatoethylmethyl methacrylate, and then polymerizing the other monomers with the functionalized homopolymer.

TABLE 4

| | AA | MAA | EHA | C4A | C6A | C6DA | C12A | C12DA | C14A | C16A | C22A |
|---|---|---|---|---|---|---|---|---|---|---|---|
| SCC1 | 5 | — | — | — | — | — | 47.5 | — | — | 47.5 | — |
| SCC2 | 5 | — | — | — | — | — | 65 | — | — | 30 | — |
| SCC3 | — | 5 | — | — | — | — | 47.5 | — | 47.5 | — | — |
| SCC4 | 5 | — | — | — | — | — | 60 | — | — | 35 | — |
| SCC5 | 3 | — | — | — | — | — | 20 | — | 60 | — | 20 |
| SCC6 | — | — | — | — | — | — | 65 | 0.25 | — | 35 | — |
| SCC7 | 1 | — | — | — | — | — | 64 | 0.1 | — | 35 | — |
| SCC8 | — | — | — | — | — | — | — | — | 100 | — | — |
| SCC9 | — | 5 | — | — | — | — | 47.5 | — | 47.5 | — | — |
| SCC10 | 3 | — | — | — | — | — | — | — | 57 | 40 | — |
| SCC11 | — | — | — | — | 15 | — | — | — | 85 | — | — |
| SCC12 | — | 5 | — | — | 15 | — | — | — | 80 | — | — |
| SCC13 | 3 | — | — | — | 42 | — | — | — | 55 | — | — |
| SCC14 | — | — | — | — | 15 | — | — | — | 85 | — | — |
| SCC15 | — | — | — | — | — | — | — | — | 100 | — | — |
| ACP | 6 | — | 47 | 47 | — | — | — | — | — | — | — |

A blend of the composition of Example 14 in Table 1 and the composition of SCC3 in Table 4 at 50/50 blend ratio by weight was prepared by melt blending in a twin screw extruder at 215° C. melt temperature. The resultant blend pellets were then converted into a 2-mil thick film by a melt casting process on a twin screw extruder at 200° C. melt temperature. The cast film was then used as the environmentally responsive gas permeation membrane for the packaging or storage applications. Gas permeability to $O_2$, $CO_2$, and moisture of the film may be measured at 5° C./50% RH, 45° C./50% RH, 23° C./25% RH and 23° C./75% RH.

Holes of 4.76 cm diameter were cut in storage bags (23×28 cm) comprising polyethylene. The holes were covered by a patch prepared from the film described above and adhered to the edge of the hole by heat sealing. The resulting bags were packages of the invention.

The invention claimed is:

1. A blended composition comprising or produced from a humidity-dependent composition and a crystallizable polymer wherein the humidity-dependent composition has a ratio of wet cup permeance to dry cup permeance greater than 10, measured according to ASTM E 96-00 at a temperature of 23° C.; the wet cup permeance is determined at an average relative humidity of 75%; and the dry cup permeance is determined at an average relative humidity of 25%; and the crystallizable polymer has a first order transition point $T_m$ from 0° C. to 40° C. and a heat of fusion of at least 5 J/g and is sufficiently permeable to oxygen, carbon dioxide, and/or water vapor; and the polymeric material exhibiting an increase in permeability to at least one of oxygen, carbon dioxide or water vapor by a factor of at least 2.5 over a temperature range of 10° C. between 0° C. and 40° C.

2. The composition of claim 1 wherein the humidity-dependent composition has water vapor transmission rate at 25% relative humidity and 23° C. lower than 10 mil-g/m²-day, and at 75% relative humidity and 23° C. greater than 100 mil-g/m²-day.

3. The composition of claim 2 wherein the humidity-dependent composition has water vapor transmission rate at 25% relative humidity and 23° C. lower than 20 mil-g/m²-day, and at 75% relative humidity and 23° C. greater than 200 mil-g/m²-day.

4. The composition of claim 3 wherein the humidity-dependent composition has water vapor transmission rate at 25% relative humidity and 23° C. lower than 30 mil-g/m²-day, and at 75% relative humidity and 23° C. greater than 300 mil-g/m²-day.

5. The composition of claim 2 wherein the humidity-dependent composition comprises an organic acid-modified ionomer, an organic acid or salt thereof; and optionally 0.1 to 60%, based on the humidity-dependent composition weight, of an optional polymer wherein the ionomer is derived from one or more ethylene acid copolymer;

the acid copolymer is derived from ethylene, at least one $C_3$ to $C_8$ α,β-ethylenically unsaturated carboxylic acid, and optionally a softening comonomer;

the organic acid is one or more carboxylic acids having from 4 to 36 carbon atoms;

at least 50% of the combined acidic groups in the acid copolymer and the organic acid are nominally neutralized with metal ions to the corresponding salts and at least 50% of the metal ions are alkali metal ions; and the optional polymer includes ethylene-containing polymers, propylene-containing polymers, or combinations of two or more thereof.

6. The composition of claim 5 wherein the carboxylic acid is acrylic acid, methacrylic acid, maleic acid, fumaric acid, itaconic acid; monoester of fumaric acid, monoester of maleic acid, or combinations of two or more thereof.

7. The composition of claim 6 wherein the carboxylic acid is acrylic acid or methacrylic acid.

8. The composition of claim 6 wherein the softening comonomer is present in the acid copolymer and is alkyl acrylate, alkyl methacrylate, vinyl acetate, or combinations of two or more thereof.

9. The composition of claim 6 wherein the humidity-dependent composition comprises the optional polymer including ethylene homopolymer, ethylene copolymer, propylene homopolymer, propylene copolymer, ethylene/propylene copolymer, or combinations of two or more thereof; ethylene copolymer includes one or more copolymers of ethylene with an α-olefin having 3 to 20 carbon atoms or with at least one polar monomer including vinyl acetate, acrylic ester, methacrylic esters, CO, maleic anhydride, or combinations of two or more thereof.

10. The composition of claim 9 wherein the optional polymer is an ethylene/vinyl acetate copolymer, ethylene/acrylic ester copolymer, ethylene/methacrylic ester copolymer, ethylene/vinyl acetate/CO copolymer, ethylene/acrylic ester/CO copolymer, ethylene/maleic anhydride copolymer, or combinations of two or more thereof.

11. The composition of claim 2 wherein the crystallizable polymer is a side-chain crystallizable copolymer comprising copolymerized repeat units n-alkyl acrylate, n-alkyl methacrylate, fluoroalkyl acrylate, or methacrylate methacrylate, or combinations of two or more thereof and one or more comonomers including acrylic acid, methacrylic acid, ester of acrylic or methacrylic acid, polar monomer, or combinations of two or more thereof; and the polar monomer is polyethylene glycol acrylate or methacrylate.

12. The composition of claim 11 wherein the humidity-dependent composition is present in from 10 to about 90 weight of the blended composition.

13. An article comprising the blended composition of claim 1 wherein the article is container, cover, wrapping, shield, a rigid or semi-rigid or flexible structure, packaging material, monolayer film, multilayer film, sheet, bag, pouch, package, or structure comprising a gas permeable substrate adhered either directly or through an intervening layer to a layer comprising the composition.

14. The article of claim 13 wherein the gas permeable substrate comprises cellulosic material, material made from synthetic fiber spun fabrics, nonwoven textile, woven textile, microporous film, or perforated film.

15. The article of claim 14 wherein the article is surrounded by air and is the container comprising one or more control sections that is the only way in which oxygen, carbon dioxide, and/or water vapor enters or leaves the container; and within the container, a material which is biologically active or interactive with the atmospheric environment through respiration, metabilization, or complexation; or contains microorganisms that cause biological changes.

16. The article of claim 14 wherein the article is the bag or the pouch having windows, patches or areas comprising the composition thereon, comprised in part of polymeric materials other than the composition.

17. The article of claim 14 wherein the article is the rigid or semi-rigid or flexible structure having one or more windows comprising the composition thereon, comprised in part of polymeric materials other than the composition.

18. The article of claim 17 wherein the rigid or semi-rigid or flexible structure is in combination with a lidding material comprising the composition or comprising in part other materials having one or more windows of the composition thereon.

19. The article of claim 14 wherein the article is the package having patches of the composition over designed openings in the package.

20. The article of claim 14 wherein the article is the package in which the composition is covered by a removable protective cover that allows a user to expose the composition to the environment.

21. A method comprising placing a biologically active material inside a container and storing the container in air wherein the biologically active material includes red meat, sea food, fruit, produce, plants, flower, seed, cheese, pickled food, fermented food, or combinations of two or more thereof;

the container comprises one or more control sections providing the only way in which oxygen, carbon dioxide, and/or water vapor enters or leaves the container and the control section comprise the composition recited in claim 1; and the storing is at a temperature $T_1$, $T_1$ is between 0° C. and 40° C. or at a second temperature $T_2$; $T_2$ is above $T_1$ and at most 40° C.; and at $T_2$, the permeability of the control section to oxygen or carbon dioxide is at least 2.5 times that at $T_1$ or the permeability of the control section to moisture is at least 10 times greater at an average relative humidity of 75% than at an average relative humidity of 25%.

* * * * *